United States Patent [19]

Lin

[11] Patent Number: 5,084,258
[45] Date of Patent: Jan. 28, 1992

[54] LIN FLUE GAS $SO_x/NO_x$ REMOVAL PROCESS AND ITS BY-PRODUCT UTILIZATION

[76] Inventor: Ping-Wha Lin, 506 S. Darling St., Angola, Ind. 46703

[21] Appl. No.: 569,173

[22] Filed: Aug. 17, 1990

Related U.S. Application Data

[63] Continuation-in-part of Ser. No. 261,376, Oct. 24, 1988, Pat. No. 4,975,257.

[51] Int. Cl.$^5$ .................. B01J 8/00; C01B 17/00; C01B 21/00
[52] U.S. Cl. ...................... 423/244; 423/235; 423/395; 423/555
[58] Field of Search ............ 423/235, 235 D, 244 A, 423/555, 244 R, 395

[56] References Cited

U.S. PATENT DOCUMENTS

| | | | |
|---|---|---|---|
| 2,718,453 | 9/1955 | Beckman | 23/2 |
| 3,733,777 | 5/1973 | Huntington | 55/48 |
| 3,781,408 | 12/1973 | Lin | 423/244 |
| 3,855,125 | 12/1974 | Lin | 210/46 |
| 3,861,930 | 1/1975 | Lin | 106/109 |
| 3,981,815 | 9/1976 | Taniguchi et al. | 423/235 |
| 4,054,463 | 10/1977 | Lin | 106/97 |
| 4,171,951 | 10/1979 | Lin | 432/77 |
| 4,229,411 | 10/1980 | Kisters et al. | 422/62 |
| 4,293,521 | 10/1981 | Isalaya et al. | 422/62 |
| 4,322,224 | 3/1982 | Roth | 55/20 |
| 4,387,078 | 6/1983 | Lin | 423/244 |
| 4,470,921 | 9/1984 | Lin | 252/189 |
| 4,482,096 | 11/1984 | Lin | 241/65 |
| 4,525,142 | 6/1985 | Gleason et al. | 423/244 |
| 4,600,570 | 7/1986 | Lin | 423/244 |
| 4,756,893 | 7/1988 | Lin | 423/244 |

OTHER PUBLICATIONS

"$SO_x$ Removal and Acid Neutralization with its By Product", by Ping-Wha Lin, Environmental Science and Technology, vol. 12, p. 1081, Sep. 1978.

"Hydration Enhanced Sulfation of Limestone and Dolomite in the Fluidized Bed Combustion of Coal", by J. A. Shearer et al., APCA Journal, vol. 30, No. 6, Jun. 1980.

Primary Examiner—Gregory A. Heller
Attorney, Agent, or Firm—Larry J. Palguta

[57] ABSTRACT

Sulfur dioxide ($SO_2$) can be oxidized to rapidly sulfur trioxide ($SO_3$) in a high temperature environment. It has been found that the $SO_2$ oxidation rate can be impeded by a high rate of temperature reduction in a dynamic condition such as in a boiler and the ductwork of a power plant and an industrial plant. The mechanism of the reaction kinetics has been developed. With the understanding of the mechanism, the methods for oxidation of $SO_2$ to form $SO_3$ have been developed. The $SO_3$ rich flue gas is treated with lime (CaO) in a fluidized lime reactor wherein $SO_3$ reacts with CaO to form $CaSO_4$ coating on the surface of CaO. The high heat generated from the $SO_3$/CaO reaction causes the remaining $SO_2$ to convert in the reactor to $SO_3$ which in turn reacts with CaO to form more $CaSO_4$. Nitrogen oxides can also be removed from flue gas by converting nitric oxide (NO) to nitrogen dioxide ($NO_2$) via a high time rate of temperature reduction within ductwork and by sudden cooling with a spray of fine water mist or water vapor. $NO_2$ reacts with water vapor to form nitric acid which in turn reacts with lime to form calcium nitrate $Ca(NO_3)_2$. The plant gas effluent, after treatment with the improved Lin flue gas $SO_x/NO_x$ removal process, is essentially free from $SO_x$, $NO_x$, and particulate materials.

21 Claims, 4 Drawing Sheets

LIN FLUE GAS SO$_x$/NO$_x$ REMOVAL PROCESS AND ITS BY-PRODUCT UTILIZATION

This is a continuation-in-part of Ser. No. 07/216,376 filed Oct. 24, 1988 and issued on Dec. 4, 1990, as U.S. Pat. No. 4,975,257.

BACKGROUND OF THE INVENTION

The Lin Process for Flue Gas Desulfurization is designed to effectively remove sulfur dioxide from stack gas in an economical manner. In my recent U.S. Pat. No. 4,975,257, incorporated by reference herein, the recently discovered mechanism of the Lin Process has been revealed The mechanism includes kinetics, a reaction model, the function of water vapor in the reactions, and others. With the understanding of the mechanism, the process can be simplified, resulting in a reduction of capital and operating costs. Referring to the accompanying FIG. 1 which illustrates a bypass flow of flue gas as disclosed in U.S. Pat. No. 4,975,257, the Lin process for retro-fitting a power plant application can be described as follows:

Gas emission from a boiler is treated to separate solid particles such as fly ash, and then split into two flow streams, designated as streams A and B. Stream A is adjusted to the optimum catalytic conversion temperature at about 800° F. before being directed through a catalytic oxidation converter where a large fraction of SO$_2$ is converted to SO$_3$. Stream B is by-passed around the catalytic converter and rejoined with stream A at the downstream side of the catalytic converter. The combined gas then enters a fluidized lime reactor where the sulfur dioxide/sulfur trioxide mixture is allowed to react with lime particles. The resulting solid material of the dry scrubbing is called "Linfan", the bulk of which can be separated from the gas and recovered as a valuable by-product. The remaining dust in the exit gas is removed by cyclones or other suitable solids removal devices located at the downstream side of the fluidized reactor. The gaseous effluent leaving the desulfurization process is essentially free of dust and sulfur oxides.

The desulfurization process is a completely dry process that offers numerous advantages over other processes. The process is effective in removing nearly 100 percent of sulfur oxides (SO$_2$ and SO$_3$) from the flue gas at temperatures ranging from 500° F. to 900° F. Furthermore, the process is highly exothermic; in passing through the catalytic converter and fluidized lime reactor, the temperature of the flue gas typically increases by 270° F. for each percent of SO$_x$ contained in the gas. The energy generated from the process can be recovered for heating or other purposes.

The resulting solid by-product of the process, Linfan, consists of a core of lime surrounded by a shell of anhydrous calcium sulfate which has a plurality of cracks. The calcium sulfate coating, being formed in high heat from the chemical reactions, is a useful material. It has been proved that Linfan can be used for plastering material, reclaiming fly ash for high-strength construction material, substituting cement in concrete production, as an important ingredient in cement production, and as a chemical for municipal and industrial wastewater treatment. Since the by-product has diversified commercial applications, the process has no waste disposal problem.

DETAILED DESCRIPTION OF THE INVENTION

Figure 1:
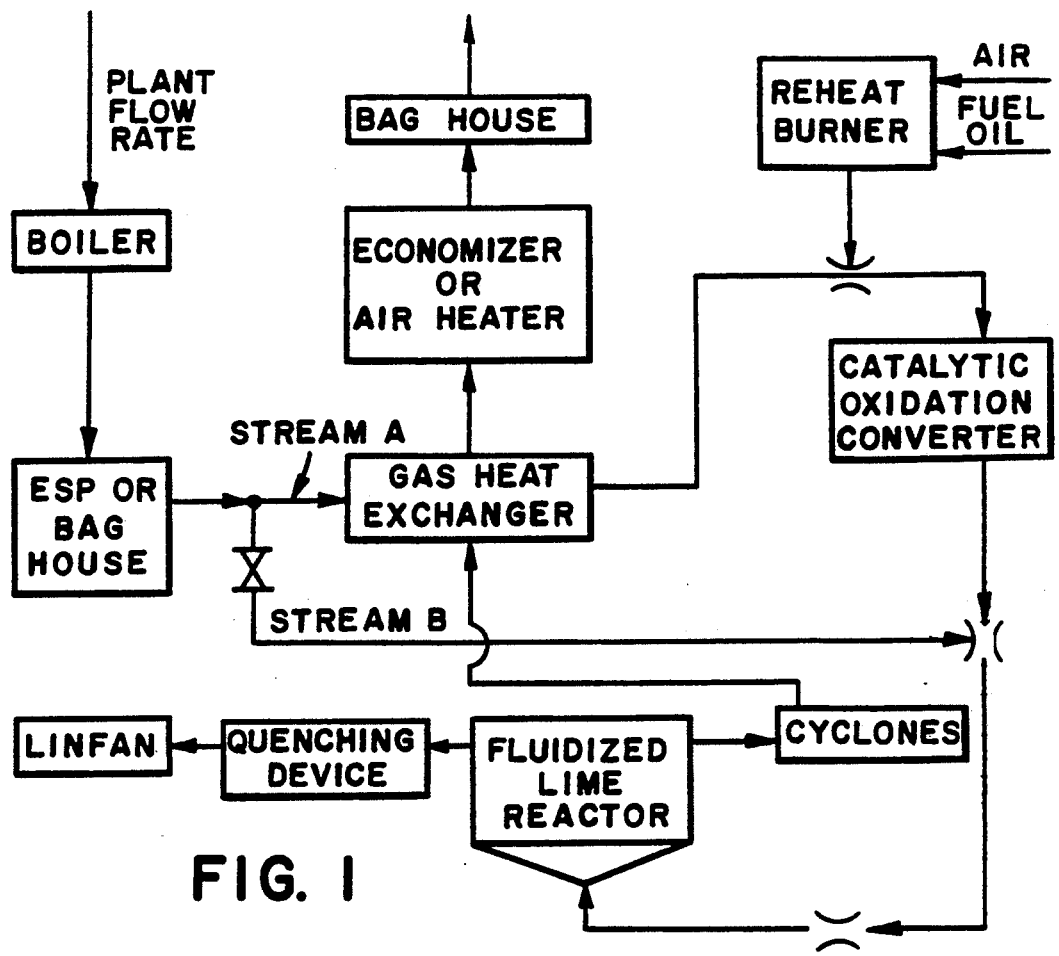
FIG. 1 is a schematic illustration of an improved process for flue gas desulfurization utilizing a flue gas bypass.

I. New Approach for the Lin SO$_x$/NO$_x$ Removal Process

This invention further reveals that the steps for catalytic oxidation in the prior art can be omitted and replaced by a means of proper temperature control of flue gas for the oxidation of SO$_2$ to SO$_3$.

The Role of Temperature and Time Rate of Temperature Change in the Oxidation of SO$_2$ to SO$_3$ SO$_2$ can be oxidized to SO$_3$ by means of a catalyst such as vanadium pentoxide. However, the use of a catalytic converter involves flue gas temperature adjustment by a heat exchanger and reheat burner to the optimal level for catalytic conversion, removal of solids in flue gas by filtering prior to the catalytic conversion for preventing plugging in the catalytic converter, and frequent maintenance work in the catalytic converter. The use of a catalyst imposes a heavy financial burden on the process.

The invention discloses a novel method for oxidizing SO$_2$ to SO$_3$ without the use of a catalyst. A recent discovery reveals that it can be achieved by the use of proper temperature control of the flue gas.

In the oxidation of SO$_2$ to SO$_3$ (an exothermic process), it is known that an increase of temperature will result in an increase of reaction speed but a reduction of equilibrium concentration of the reaction product. Since the concentration of SO$_2$ in flue gas is low, usually less than 1%, even the sulfur dioxide is completely oxidized, and the sulfur trioxide concentration in the flue gas is still below the equilibrium concentration at high temperature. Therefore, equilibrium concentration is not an important factor in the reaction.

It has been proved that $SO_2$ in the presence of $SO_3$ can be efficiently converted to $SO_3$ in the fluidized lime reactor. This was due to the intense heat generated from the reaction between lime and $SO_3$, and the high local temperature on the surface of lime particles facilitates the rapid oxidation of $SO_2$ to $SO_3$.

In a furnace of a power plant at the point where coal is being burned and $SO_2$ generated, the flame temperature of the gas is usually above 3000° F. As the gas flows upward in the furnace, the temperature is rapidly reduced. However, even at a point before the superheater at the top of a furnace, the temperature is still slightly above 2000° F. The question: why in such a high temperature environment is the $SO_2$ conversion efficiency to $SO_3$ so low? The reason can be explained mathematically as follows.

In the oxidation of $SO_2$ to $SO_3$ as represented by the following formula $$SO_2 + \tfrac{1}{2}O_2 \to SO_3 \tag{1}$$

the final concentration of the resulting product, $SO_3$, is a function of several factors, namely sulfur dioxide concentration, oxygen concentration, background particle concentration, temperature, and time. Mathematically, it can be expressed by the following expression:

$$[SO_3] = F\{[SO_2], [O_2], [M], T, t\} \tag{2}$$

Therefore, the time rate of $SO_3$ production can be calculated by the following partial differential equation $$\frac{d[SO_3]}{dt} = \frac{\delta F}{\delta [SO_2]} \frac{d[SO_2]}{dt} + \frac{\delta F}{\delta [O_2]} \frac{d[O_2]}{dt} + \frac{\delta F}{\delta [M]} \frac{d[M]}{dt} + \frac{\delta F}{\delta T} \frac{dT}{dt} + \frac{\delta F}{\delta t}$$

Where
 $[SO_3]$ = $SO_3$ concentration in mole
 $[SO_2]$ = $SO_2$ concentration in mole
 $[O_2]$ = Oxygen concentration in mole
 $[M]$ = Background particles concentration in mole
 T = Temperature, absolute
 t = Time in second For the flue gas with low $SO_2$ concentration, the time rates of change in oxygen concentration, $d[O_2]/dt$, and background particle concentration, $d[M]/dt$, are not significant. In furnace and duct work, however, the temperature of flue gas is rapidly changed from a high level to a low level, therefore, time rate of temperature change, $dT/dt$, being very significant, can not be neglected in the calculation. In order to make the chemical oxidation of $SO_2$ occur in the duct work, there is presented a unique and challenging problem, and solution.

The reaction rate of oxidation of $SO_2$ to $SO_3$ depends on temperature. The higher the temperature, the higher the reaction rate. In a power plant or other industrial plant, the temperature of the flue gas usually changes from a high level to a low level on account of heat loss and heat transfers at superheaters, economizers, preheaters, etc. Therefore, $dT/dt$ actually is a negative value. From the afore-mentioned partial differential equation (3), a negative $dT/dt$ has a retarding effect for the reaction as far as the kinetics is concerned. Apparently, $SO_2$ is difficult to oxidize to $SO_3$ either in the furnace or flue gas duct works.

Can The Arrhenius Equation Be Used In Finding Reaction Rate in Air Pollution Control?

Traditionally the Arrhenius equation is widely used for calculating a chemical reaction rate constant and it is expressed as follows:

$$K = Ae^{-E/RT} \text{ or } K = AT^m e^{-E/RT}$$

where
 K = rate constant
 A is a "pre-exponential" constant
 E is the activation energy
 T is absolute temperature.

Although the Arrhenius equation shows the temperature dependency of the reaction rate, it does not include the term of time rate of temperature change. Apparently, it is useful only for a static condition in which the temperature of experiment is maintained more or less at a constant value. In air pollution control for a power plant or other industrial plant, the temperature of flue gas changes rapidly from one section to another and the chemical reactions occur in an unsteady condition, therefore the Arrhenius equation can not be used to predict the reaction rates there.

The Role of Water Vapor in Flue Gas for Oxidation of $SO_2$ To $SO_3$

Flue gas usually contains water vapor, therefore the following reactions also take place:

$$SO_2 + \tfrac{1}{2}O_2 \rightleftarrows SO_3 \tag{1}$$

$$SO_3 + H_2O \to H_2SO_4 \tag{4}$$

The formation of $H_2SO_4$ vapor in equation (4) removes $SO_3$ from the flue gas, and thus, causes the reaction in equation (1) to shift to the right direction, resulting in more $SO_3$ production in the flue gas. Equation (4) is not significant in a very high temperature environment.

Two New Approaches For The Oxidation of $SO_2$ to $SO_3$

The oxidation of $SO_2$ to $SO_3$ can be enhanced by two approaches without using a catalyst, and they are:

A. increase the temperature of the flue gas in order to increase the energy levels of all the particles in the flue gas. Richard C. Flagan and John Senfeld (*Fundamentals of Air Pollution Engineering*, pg. 218, Prentice Hall) indicated that at a steady state level, the characteristic time for $SO_3$ oxidation is about 0.009 second for $\Phi = 0.9$ at 1700° K., but increases to 0.13 second at 1500° K. ($\Phi$, equivalence ratio, is defined as the fuel/air ratio normalized with respect to the stoichiometric fuel/air ratio). By employing $+dT/dt$ and inducing turbulence in the dynamic environment, such as a gas desulfurization system for air pollution control, the reaction time can be further reduced.

B. by the use of a thermal radiator, the temperature of which is increased to a level so that the radiation can be maximally and selectively absorbed. It is known that many monatomic and symmetrical diatomic gases such as $O_2$ and $N_2$ absorb little or no thermal radiation but many polyatomic gases such as $SO_2$, $CO_2$ and water vapor, etc. do. By using a thermal radiator such as a steel plate, the temperature of the radiator can be increased to a level so that the radiation can be maximally and selectively absorbed by $SO_2$, water vapor and $CO_2$. In that way, $SO_2$, water vapor and $CO_2$ molecules in the flue gas are energized and vibrated, and the collision of molecules and the combination of $SO_2$ and $O_2$ are enhanced.

It should be noted that gases and vapors do not absorb radiation at all wavelengths. In a vacuum, the absorption bands of $SO_2$ molecules are mainly in the wavelength band of 8.70, 19.08, 7.34 micron, respectively or wave number 1151, 524, 1361 $cm^{-1}$, respectively. It absorbs radiation only in the wavelength band in the intermediate infrared region. It is therefore possible that even though the temperature of flue gases is lower than that on the surface of the radiator, $SO_2$ molecules can still be energized by the absorption of radiation, resulting in $SO_2$ molecular vibration and collision with other molecules. Thus, the oxidation of $SO_2$ molecules is enhanced.

The basic constituents making up the flue gas are $CO_2$, water vapor, and about 75% oxygen and nitrogen. As mentioned before, oxygen and nitrogen do not absorb radiation in the infrared range. In the radiation of the wave number of 1595 $cm^{-1}$, water vapor exhibits very strong vibrational motion. $CO_2$ molecules develop vibration at 667.3, 1285.5 and 1388.3 $cm^{-1}$ bands in infrared. The chance of collision of the energized water vapor and $CO_2$ molecules with background molecules will be greatly increased in these wave number ranges, and the collisions will help energy transfer. Therefore, the presence of water vapor and $CO_2$ can indirectly help the oxidation of $SO_2$ to $SO_3$ by radiation. It is known that thermal radiation overlaps the visible light and infrared spectrum. The higher the temperature of the radiating surface, the shorter the predominant wavelength of the thermal radiation emitted by it. It appears that the oxidation of $SO_2$ to $SO_3$ can be best served by the temperature of the radiating surface being above 1200° F. and concentrating the radiation in a band having wave numbers from 500 to 1600 $cm^{-1}$.

A black body is a good source of radiation. The emissivity for boiler materials is usually between 0.80 and 0.95, therefore, they are also good sources of radiation.

II. Methods For Oxidation Of $SO_2$ to $SO_3$ In Ductwork

Understanding the reaction mechanism, the methods for the oxidation of $SO_2$ to form $SO_3$ can be properly developed, and they are illustrated as follows:

1. Increase $SO_2$ Oxidation Rate by a Heated Impact Plate

Figure 2:
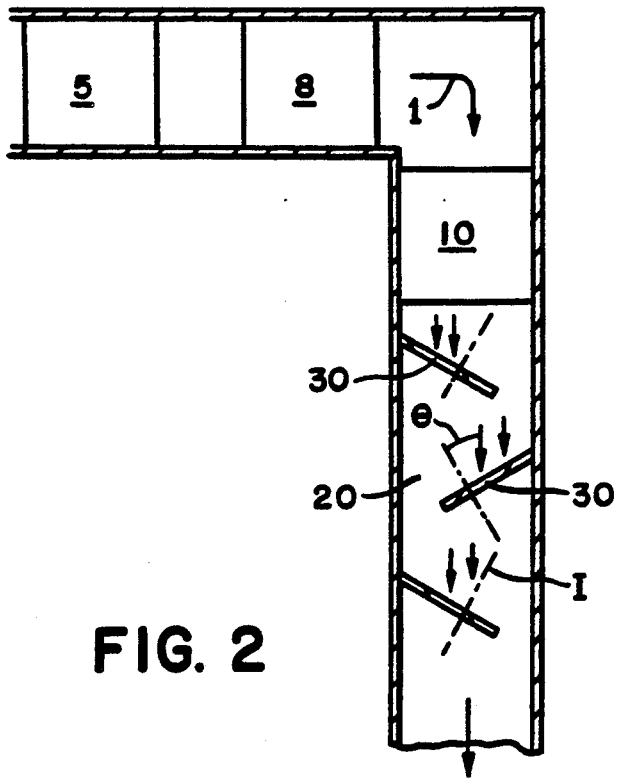
FIG. 2 illustrates the present invention which utilizes heated impact plates with the ductwork.

As explained previously, in order to efficiently produce $SO_3$ by oxidation of $SO_2$, $dT/dt$ must be a positive value. A positive $dT/dt$ is a powerful driving force to form $SO_3$. It follows that the temperature of flue gas should be increased rapidly to its optimum high temperature level at a selected section of the duct work, preferably downstream the superheater where the gas temperature is about 900° F. Referring to FIG. 2, flue gas 1 from the primary superheater 10 enters into space 20 containing heated impact plates 30. By directing the flue gas to the surface of each impact plate, the temperature of which is preferably maintained at above 1500° F., the conversion of sulfur dioxide to sulfur trioxide is enhanced. The flue gas 1 may flow through a secondary superheater 5 and reheat superheater 8 located upstream from superheater 10.

Figure 2A:
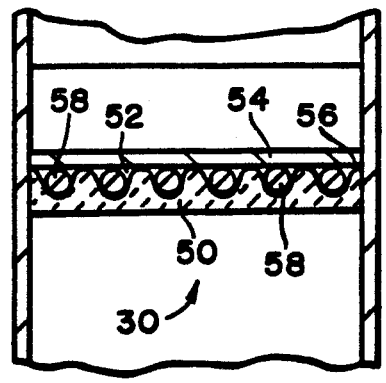
FIG. 2A is a section-view of the ductwork and an impact plate.

FIG. 2A shows the construction of the heated impact plates 30 that is used for increasing oxidation time rate of $SO_2$ to $SO_3$ in a ductwork of a power plant or an industrial plant. The device consists of a support 50 made of insulated material such as ceramic. The ceramic support has a ridge and valley cross section and a heating space 52 is provided between the ceramic backing and a metallic plate 4 which is fitted to the ceramic backing by joint material 6 or by other mechanical means. A joint compound that can sustain differential thermal expansion of two materials subject to high differential temperatures is available. Electric resistors 58 are placed in the valley portion of the ceramic backing. Heating of space 52 and the metallic plate is done by passing electricity to the resistors 58 which in turn raise the temperature of the metallic plate 54.

The metallic plate is made of steel, other iron alloy or equivalent. When iron alloy or steel is used, a large amount of energy is stored in the material upon heating when its crystal form is changed from body centered cubic (bcc) to face centered cubic (fcc) in a known conversion temperature range (above 1300° F.). For example, a 0.4% carbon steel changes from body centered cubic to face centered cubic crystal form in the temperature range of about 1380° F. to 1430° F. The change of crystal form requires a large amount of energy and the energy is stored in the material when the transformation is completed. As the process for changing the crystal form from body centered cubic to face centered cubic is reversed, the stored energy must be released. Apparently the change of crystal form of iron alloy has a regulating temperature effect and prevents the iron alloy from falling below the specified temperature range which happens to be near the desirable temperature for the oxidation of $SO_2$ to $SO_3$.

The flue gas is directed at an angle $\Theta$ (preferably between 30° and 45°) with the line of impact (a line I perpendicular to the impact surface) and causes an oblique impact to form. The velocities of the gas particles before the impact are resolved into two components, i.e., one perpendicular to the metallic plate and one parallel to the plate. The impact takes place only along the line of impact I which is perpendicular to the hot metallic plate 54. Since the metallic plate has a thin hot gas film, the coefficient of restitution can be treated as zero, therefore, the impact can be treated as a perfectly plastic impact. For a perfectly plastic impact, the velocity component perpendicular to the metallic surface after impact is reduced to zero while that parallel to plate 54 remains unchanged. Therefore, the gas particles travelling on the surface of the metallic plate after impact are more or less parallel to the surface. On the other hand, because of the high gas temperature gradient near the surface of the metallic plate, convective turbulence also is induced on the surface of the plate, resulting in an increase in the chance of molecular collision, thus further enhancing the oxidation of $SO_2$ to $SO_3$. Oblique impact has another advantage in that the accumulation of solid particles on the surface of the metallic plate 54 can be eliminated, because the turbulence moving on the surface of the plate simply sweeps the particles away.

The heat transfer from the hot metallic plate to the gas molecules is achieved by radiation, convection and conduction. From a high temperature surface, radiation is most important. Convection can only help to move particles from place to place and then heat is transferred between molecules by conduction. With regard to the heat transfer by radiation, as pointed out previously, monatomic and symmetric diatomic particles such as oxygen and nitrogen do not absorb radiation. Other particles such as sulfur dioxide, carbon dioxide and water vapor do absorb thermal radiation of certain wavelengths. As the flue gas flows over the heated metallic plate, the flue gas as a whole is heated up by convection and conduction. In the meantime, $SO_2$, water vapor and $CO_2$ molecules are also heated up and energized by the radiation of correct frequency. Vibrations of molecules promote collisions which help energy transfer between molecules. Thus, its oxidation is enhanced.

FIG. 2 is the proposed flow diagram employing the heated impact plates 30 for a power plant flue gas desulfurization process. The impact plates 30 are placed at strategic positions in the ductwork, as shown. By using the heated impact plates, a catalytic converter can be omitted. As a result, there is no need to provide a high efficiency solids removal system for the prevention of plugging in the catalytic converter. Furthermore, no elaborate heat exchanger system is required to adjust the flue gas temperature to the optimum conversion temperature of the catalyst. This invention will contribute a significant reduction in capital investment. Furthermore, the heat supplied to the impact plates is not wasted, because it remains in the system; it is conveyed to the flue gas. Once the temperature of the heated impact plates is raised to the desired level, the additional energy required to maintain the temperature at that level need not be high, because in the fast moving gas stream, only a small fraction of the gas particles is able to absorb the radiation, and gas heat transfer by conduction is not very high. Also, the heat released from the exothermic reaction (oxidation of $SO_2$ to $SO_3$) can help to supply a portion of the heat.

2. Increase of $SO_2$ Oxidation Rate by a Heated Space

Figure 3:
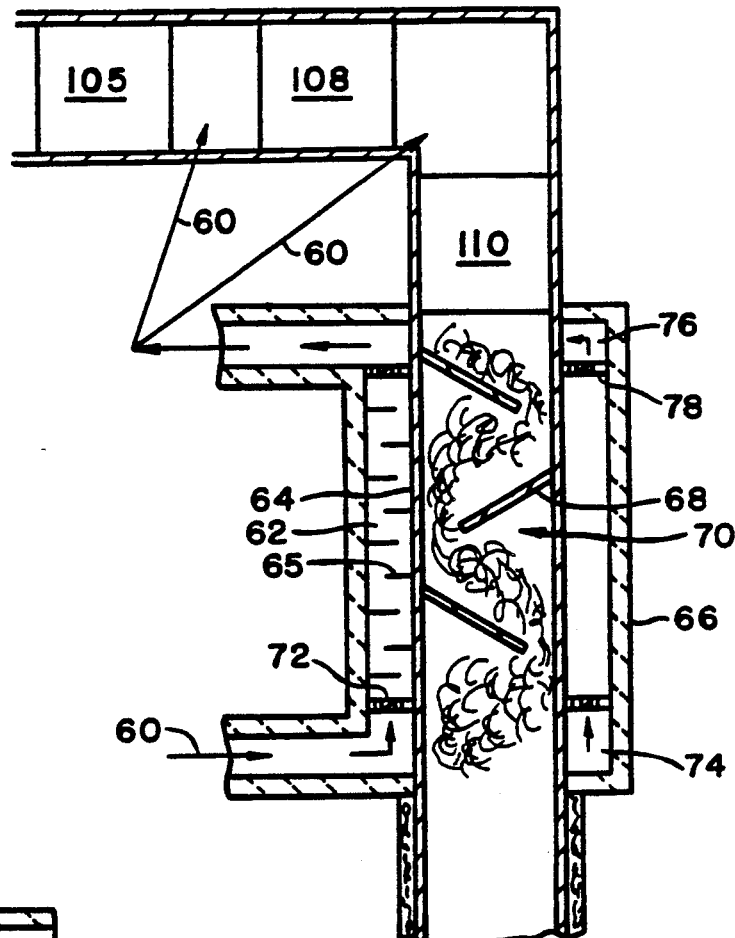
FIG. 3 illustrates the present invention which utilizes a heated space about the ductwork and impact plates.

Referring to FIG. 3, flue gas from primary superheater or economizer 110, having a temperature of about 900° F. and 500° F., respectively, flows down into the heating zone 70. FIG. 3 shows that the gas treatment facilities are located at the downstream side of the primary superheater 110, but the facilities can also be located downstream an economizer. The heat for the space is provided by the hot flue gas 60 drawn directly from a furnace at a point before secondary superheater 105 or from the space between the secondary and reheat superheaters 105,108. The gas (from a furnace) has a temperature of about 2000° F. The hot gas flows first into a head room 74 and through a distribution means to distribute the hot gas uniformly across the heating space 62. As an example, the distribution means used here is a perforated plate 72. The hot gas flows upward in distribution heating space 62 which is bound by a steel plate 64 as a flue gas duct and an insulated wall 66 made of ceramic and/or other heat insulation materials. The heating space 62 is provided with baffles 65 welded to the steel wall. The baffles are used not only for inducing mixing for better heat transfer, but also strengthening the steel duct for the prevention of buckling. The gas exiting 60 from heating space 62 passes through a perforated plate 78 and is collected in a headroom 76 from which flue gas is discharged back to the boiler at a point preferably between the reheat superheater 108 and primary superheater 110, or between the superheaters 105,108. Impact plates 68 made of steel or other iron alloy are provided in the heating zone 70. They are welded to the steel plate duct at an angle of preferably between 60° and 45° with the duct surface. Because of heat transfer through the steel plate, there is a reduction of gas temperature in the heating space 62 as the hot gas flows upwardly. In the meantime, the flue gas from primary superheater 110 flowing downwardly into heating zone 70 is subjected to a thermal shock. The sudden temperature increase of flue gas due to heat transfer, and that of $SO_2$ molecules due to absorption of radiation, plus the turbulence induced by impact and thermal convection, provide the tremendous driving force for the oxidation of $SO_2$ to $SO_3$. As the flue gas flows downwardly in a zigzag manner, the temperature of the flue gas is increased. Therefore, the positive gas temperature gradient in the heating zone forces more $SO_2$ to be oxidized to $SO_3$.

Figure 4:
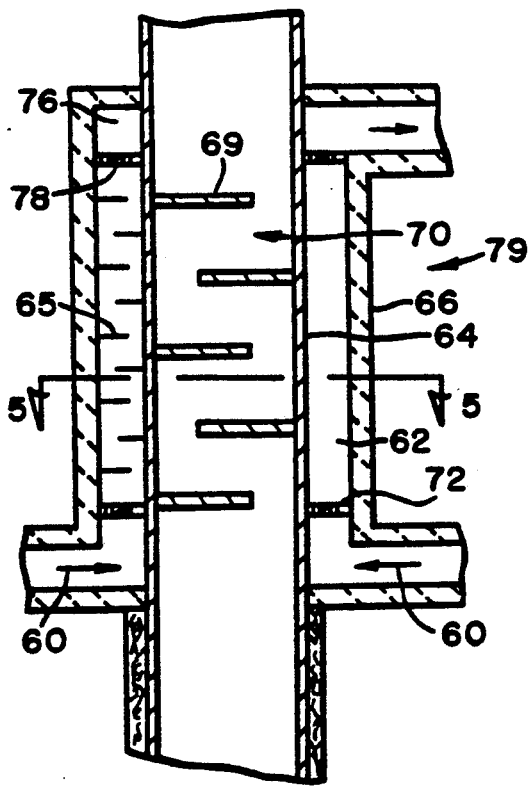
FIG. 4 illustrates a heated space about a ductwork with orthogonally positioned impact plates.
Figure 5:
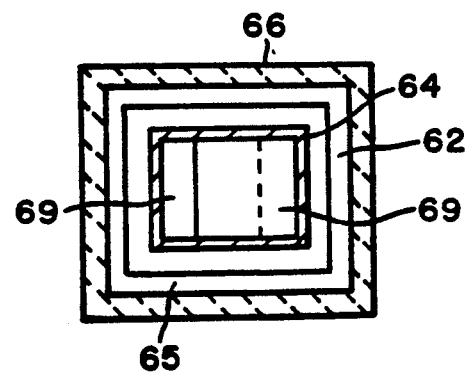
FIG. 5 is a section view along view line 5—5 of FIG. 4.

FIG. 4 shows the same arrangement as FIG. 3 except that the impact plates 69 are perpendicular to the duct wall. The impact plates form a cascade reactor 79 and the flue gas takes a turbulent and tortuous path in the reaction zone. The hot gas 60 may be received from either a furnace or from the space between the secondary and reheat superheaters, as described above for FIG. 3. FIG. 5 is a cross-section view of FIG. 4.

2A. Alternative Method to Increase $SO_2$ Oxidation Rate by a Heated Space

Figure 6:
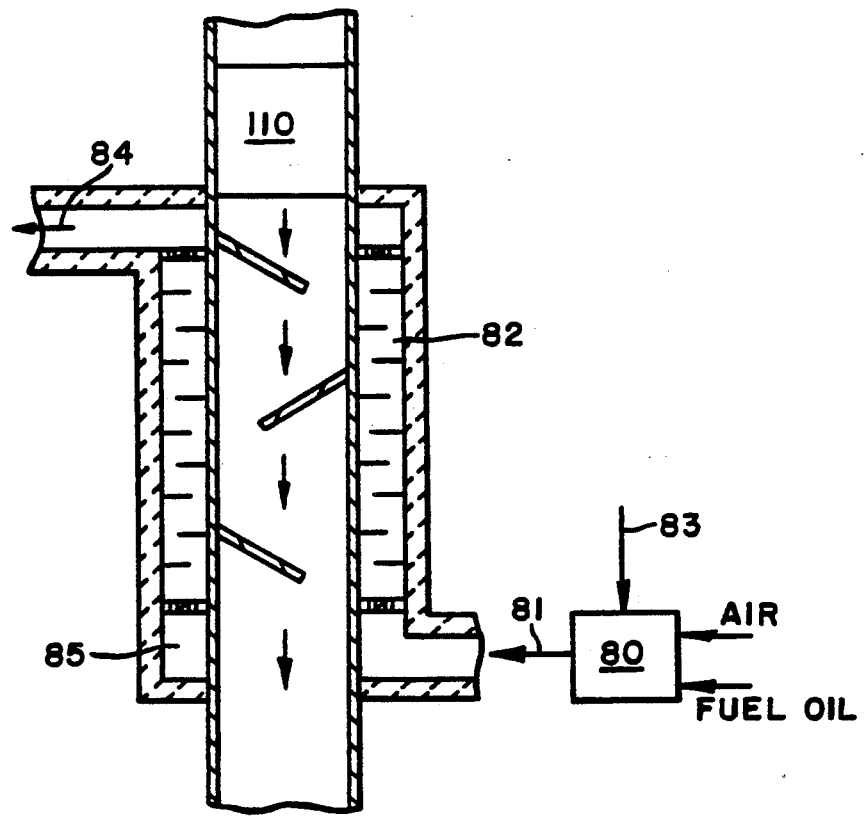
FIG. 6 illustrates a heated space about a ductwork with impact plates, and hot gas for the space provided by alternative means.

Instead of drawing the hot gas from a furnace, the hot gas 81 is produced in a burner 80 and injected into the head room 85 of the heated space 82 as shown in FIG. 6. Optionally, burner 80 may receive some hot flue gas 83 from an associated secondary superheater or a reheat superheater. The cooled gas 84 from the heated space is injected into the boiler preferably at the downstream side of an associated reheat superheater. Although extra energy is spent in the burner, the energy is not wasted because the heat will remain in the whole system for power generation. The scheme is more suitable for retrofitting a power plant by involving fewer alterations. Block 110 may be either a primary superheater or economizer.

Figure 7:
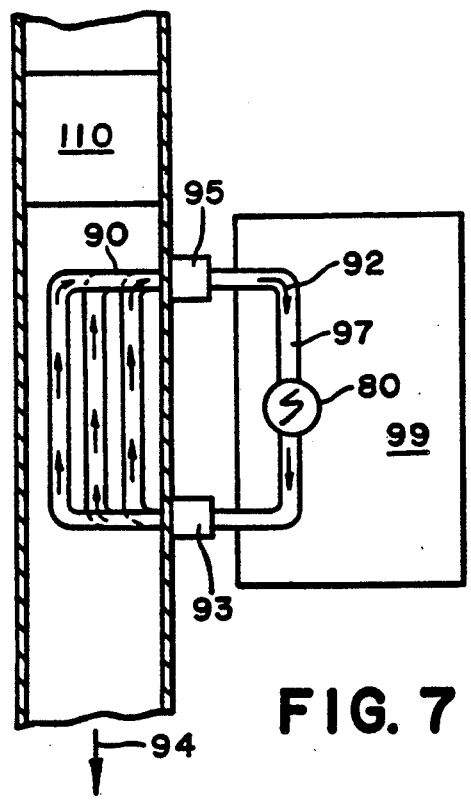
FIG. 7 illustrates the present invention wherein a heat medium is continuously cycled through a furnace and a ductwork.

2B. Alternative Method to Increase $SO_2$ Oxidation Rate by Cycling a Heated High Specific Heat Medium FIG. 7 shows a high specific heat medium picking up heat at a furnace 99 or other heating means and entering a distributor 93 whereby a medium 92 is distributed to pipes 90. The medium moves upward against the flow direction of flue gas 94 in the pipes 90 in a heating zone 91 of the ductwork. The temperature of the medium as it enters the heating zone 91 is preferably above 1500° F., but this is only an estimate and it is feasible that lower temperatures would work adequately. The medium 92 flows countercurrent against the direction of flue gas 94 in the ductwork 96. The cooled medium is collected by the collector 95 and flows through pipe 97 and heat exchanger 80. The medium after picking up the heat at the heat exchanger, recycles back to heating zone 91 of the ductwork. The medium used can be superheated steam, sodium, helium, nitrogen or others.

When gaseous medium is used, the maniford pipe 97 can extend directly into a furnace 99 from which heat is extracted by the medium. Therefore, the gaseous medium temperature reaches its highest level as it leaves furnace 99 and before entering the distributor 93. From basic gas laws for adiabatic expansion and contraction, an increase of temperature is accompanied with an increase of pressure. Therefore, the pressure of the gas medium is at its highest level at the point where the gas leaves the furnace 99. This high pressure is the driving force to move the medium upward in the pipes 90. As the medium moves upward, its heat is continuously removed by the flue gas 94 moving downwardly in the heating zone. The temperature of the medium reaches its lowest level as it leaves the collector 95 and flows into pipe 97. Once inside the furnace, the medium extracts heat continuously in the furnace, and its temperature and pressure reaches its highest level again after it leaves the furnace. The heating and cooling process of the medium repeats itself. Thus, the medium is driven continuously through the piping system by the differential thermal energy. No mechanical pumping is needed.

3. Increase the Reaction Rate of $SO_2$ Oxidation by Thermal Shock

Figure 8:
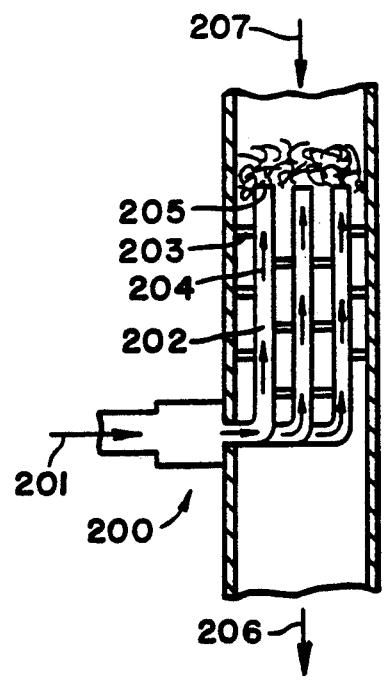
FIG. 8 illustrates the present invention wherein hot flue gas is subjected to a thermal shock to increase the flue gas temperature as a whole.

Referring to FIG. 8, hot gas 201 at about 2000° F. is drawn from a furnace and injected into the gas distributor 200, from which the hot gas is distributed to a number of pipes 202. Hot flue gas may be drawn optionally from a location between the secondary and reheat superheaters. The pipes 202 are extended to various positions in the flue gas duct and then bent ninety degrees upwardly and continue to extend to a level about ten feet below a primary superheater or economizer (not shown). The pipes are bound and supported by metal strips 203 which serve not only as stiffeners, but also help to generate flue gas turbulence for facilitating the heat transfer. The hot gas 201 flows upwardly in the pipes in a direction opposite to the flue gas 207 flow from the primary superheater or economizer. In order to induce gas swirl motion, the open ends 205 may optionally be bent 45° to 60° from the axis of the pipes 202. The hot gas 201 leaves the pipes at their open ends 205 and forms a hot gas layer at the top of the pipes. Meanwhile, the relatively cold flue gas 207 from the primary superheater or economizer sinks into the hot gas layer, causing vigorous mixing. As cold gas molecules intermingle with hot gas molecules, the cold molecules experience a thermal shock or steep time rate of temperature change, by which the $SO_2$ molecules are rapidly oxidized to $SO_3$. The well mixed flue gas 206 extracts more heat from the hot pipes 202 as it moves downward to an economizer or preheater (not shown). The positive temperature gradient effects a high time rate of oxidation of $SO_2$ to $SO_3$ in the duct heating region.

The hot gas 201 from the furnace contains fly ash, and it is actually a low bulk density two-phase flow. Fly ash is a refractory material and it can serve as a reservoir for heat. After the flow 201 leaves the open ends 205 of the pipes 202, the gas portion cools down rapidly after mixing with the flue gas from the superheater. The temperature of the fly ash is lowered at a slower rate on account of its high heat capacity, and can serve as a promoter for $SO_2$ oxidation for a longer period of time. Each hot fly ash particle induces convective gas flow on its surface. Thus, the gas molecules are energized and molecular collisions are enhanced. As a result, $SO_2$ oxidation rapidly takes place near the surface of fly ash.

Figure 9:
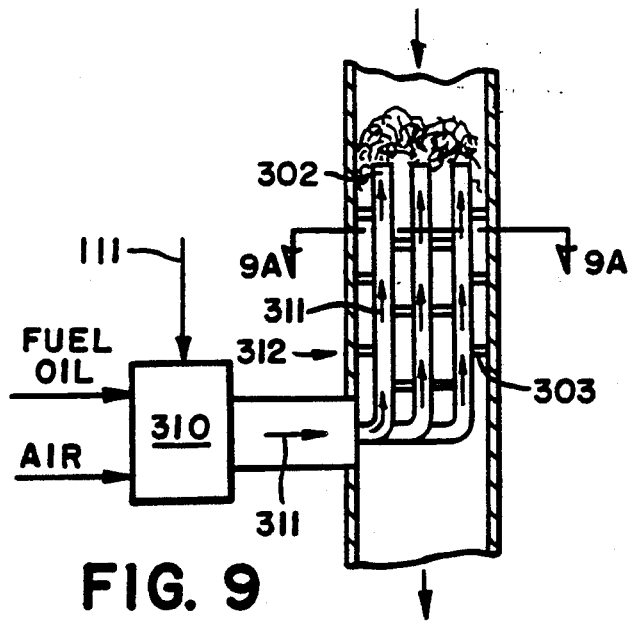
FIG. 9 illustrates an alternative means for effecting a thermal shock of the flue gas.
Figure 9A:
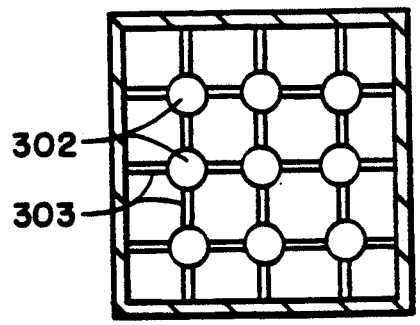
FIG. 9A is a section-view along view line 9A—9A of FIG. 9.

3A. Alternative Method to Increase the Reaction Rate of $SO_2$ Oxidation by Thermal Shock:

FIGS. 9 and 9A show an alternative method to increase the oxidation rate of $SO_2$ by thermal shock. Fuel oil and air are injected into a reheat burner 310 and burned. Optionally, a portion of the flue gas 111 at the downstream side of a secondary superheater, reheat superheater or economizer (not shown) may also be withdrawn and injected into the burner 310. The injected flue gas 111 containing $SO_2$ is subjected to an abrupt temperature rise in the burner 310, and its $SO_2$ content is oxidized to $SO_3$ The hot gas from the burner enters the gas distributor 312, from which the hot gas 311 is distributed into pipes 302 supported by strips 303. The incoming flue gas 314 containing $SO_2$ is subjected to an abrupt temperature rise, thus, its $SO_2$ is oxidized to $SO_3$. The operation mode from thereon is the same as FIG. 8 as described previously. FIG. 9A is the sectional view of FIG. 9, showing the suggested pipe arrangement.

III. Nitrogen Oxides Removal By Lin Process

In a past pilot plant study, $NO_x$ removal was studied along with $SO_x$ removal. The pilot plant can be described briefly as follows. The flue gas rich in $SO_x$ was withdrawn from a point at the downstream side of the vanadium catalytic converter in the sulfuric acid plant. The air for diluting $SO_x$ in the flue gas was heated before mixing with $SO_x$ rich flue gas. The well mixed gas was introduced to the fluidized lime reactor. In the meantime, $NO_2$ from a gas cylinder was injected to the windbox of the reactor. The flue gas from the reactor flowed through a cyclone and a venturi scrubber, before releasing to the atmosphere. $NO_x$ concentrations were measured at the reactor inlet, reactor outlet and pilot plant outlet Table 1 is the unpublished specific results of the investigation. The absence of interaction between lime and $NO_2$ in the fluidized lime reactor was probably due to short residence time of the flue gas and high temperature environment in the fluidized lime reactor. However, $NO_2$ was completely removed by the venturi scrubbing system at the downstream side of the fluidized lime reactor. The $NO_2$ removal is apparently due to the reaction with water and entrained lime (the reaction mechanisms are shown in the subsequent section).

TABLE 1

| Nitrogen Dioxide Removal* by Lin System | | | | | | |
|---|---|---|---|---|---|---|
| | Temperature (°F.) | | Nitrogen Dioxide Concentration (ppm) | | | |
| Time | Reactor | Plant Effluent | Reactor Inlet | Reactor Outlet | Plant** Effluent | Overall Plant $NO_2$ Removal Efficiency (%) |
| 2:10 | 725 | 108 | 200 | 200 | 0 | 100 |
| 2:20 | 739 | 108 | 200 | 200 | 0 | 100 |
| 2:30 | 733 | 109 | 200 | 200 | 0 | 100 |
| 2:40 | 719 | 108 | 500 | 500 | 0 | 100 |
| 2:50 | 724 | 109 | 500 | 500 | 0 | 100 |
| 3:00 | 727 | 110 | 500 | 500 | 0 | 100 |
| 3:10 | 733 | 111 | 800 | 800 | 0 | 100 |
| 3:20 | 737 | 112 | 800 | 800 | 0 | 100 |
| 3:30 | 745 | 113 | 800 | 800 | 0 | 100 |
| 6:00 | 627 | 101 | 200 | 200 | 0 | 100 |

TABLE 1-continued

Nitrogen Dioxide Removal* by Lin System

| | Temperature (°F.) | | Nitrogen Dioxide Concentration (ppm) | | | |
|---|---|---|---|---|---|---|
| Time | Reactor | Plant Effluent | Reactor Inlet | Reactor Outlet | Plant** Effluent | Overall Plant NO$_2$ Removal Efficiency (%) |
| 6:25 | 586 | 99 | 200 | 200 | 0 | 100 |
| 6:55 | 652 | 100 | 500 | 100 | 0 | 100 |
| 7:05 | 672 | 102 | 500 | 100 | 0 | 100 |
| 7:17 | 709 | 102 | 500 | 100 | 0 | 100 |

*Performed at Cairo Chemical Corp., Cairo, Ohio, on September 27 and October 1, 1983, respectively. Fifty pound Marblehead lime used. Superficial velocity of the gas flow = 1.5 ft/s.
**After the fluidized lime reactor and the cyclone scrubber.

Chemistry of NO$_x$ Removal in Lin Process

During the fossil fuel combustion, both nitric oxide, NO, and nitrogen dioxide, NO$_2$, are produced; but the vast majority of nitrogen oxides are emitted as NO. The formation of NO by oxidation can be expressed by the overall formula:

$$\tfrac{1}{2}N_2 + \tfrac{1}{2}O_2 \rightarrow NO \tag{5}$$

Nitric oxide is the most stable oxide of nitrogen. In order to remove nitrogen oxides in the Lin system by chemical means, nitric oxide must be converted to nitrogen dioxide first.

Nitric oxide reacts with oxygen to form nitrogen dioxide and the equilibrium equation is expressed by the overall reaction formula as follows:

$$NO + \tfrac{1}{2}O_2 \rightleftharpoons NO_2 \quad \Delta H = -13,450 \text{ g-cal} \tag{6}$$

$$2NO + O_2 \rightleftharpoons N_2O_4, \quad \Delta H = -40,500 \text{ g-cal} \tag{7}$$

At 240° F. most of N$_2$O$_4$ is disassociated into NO$_2$.

The NO$_2$ production rate is a function of NO concentration, oxygen concentration, background concentration, temperature and time. According to D. B. Wilson (*Temperature Sensitivity of Rate Constants: Arrhenius Relations*, AICHEMI, Series E: Kinetics, Vol. I, AICHE), the equilibrium conversion is favored by lower temperature; the reaction rate diminishes with an increase of temperature. In the oxidation of NO to NO$_2$, the lower is the temperature, the higher is the reaction rate. From the logic of equation (2) I developed for the oxidation of SO$_2$, it follows that the rate of NO$_2$ formation is favored by a rapid cooling of combustion product in the presence of oxygen.

In the temperature range of the flue gas in a power plant or other industrial plant, oxidation of NO occurs usually in a lower temperature region. As explained before, the flue gas in a power plant flows from a high temperature region to a low temperature region; the negative temperature gradient ($-dT/dt$) can increase the reaction rate. Evidently, in a power plant the driving force does exist there as far as the oxidation of NO to NO$_2$ is concerned. If at a selected section of the duct work, the flue gas is suddenly cooled, or the negative temperature gradient is precipitously increased, the production of NO$_2$ is greatly enhanced.

The equation for time rate of NO oxidation is given by Wourtzel (Thorpe's Dictionary of Applied Chemistry, pg. 520, 14th Ed., Vol. 8, Longman) as $d(P_{no})/dt = k(P_{no})^2(O_2)$, where t is in seconds and P is in mm. Hg, and the velocity coefficient, k, at different temperatures are:

TABLE 2

| t° (C.) | 0 | 25.2 | 85.5 | 100 | 150 |
|---|---|---|---|---|---|
| 10$^4$K | 10.63 | 8.73 | 5.67 | 4.80 | 3.35 |

From the equation and the table above, it is apparent that the velocity of oxidation for NO is dependent on temperature; the lower the temperature, the higher the oxidation rate. Table 2, however, does not take the rate of temperature change into consideration. In a power plant, as flue gas flows rapidly from a high temperature region to a low temperature region, the time rate of NO oxidation is further increased by the high time rate of temperature reduction. It is expected that the reaction rate in the flue gas transportation system in a power plant or industrial plant is higher than that calculated by the Wourtzel formula.

Nitrogen dioxide is reactive gas. In the presence of water, nitric acid is formed:

$$3NO_2 + H_2O \rightarrow 2HNO_3 + NO \tag{8}$$

Nitrogen dioxide can also react with lime to form calcium nitrite, calcium nitrate, and nitrogen:

$$2\,CaO + 4\,NO_2 \rightarrow Ca(NO_2)_2 + Ca(NO_3)_2 \tag{9}$$

$$Ca(NO_2)_2 + 2NO_2 \rightarrow Ca(NO_3)_2 + 2NO \tag{10}$$

$$Ca(NO_2)_2 + 2NO \rightarrow Ca(NO_3)_2 + N_2 \tag{11}$$

Removal of NO$_2$ in equations (8), (9), and (10) destroys the equilibrium in equation (6), and causes the reaction to shift to the right, resulting in more nitrogen dioxide production and higher NO$_x$ removal efficiency. Apparently, NO$_2$ can be removed by water and lime at low temperature.

The Improved NO$_x$ Removal System

From the afore-mentioned pilot plan observations and reaction mechanism, it follows that by injection of water into the duct after the fluidized lime reactor to cool the flue gas to about 240° F. and by providing sufficient duct length to increase the gas reaction time to about 3 seconds at the downstream side of the fluidized lime reactor, a large portion of NO$_x$ in the flue gas can be removed. During this short period of reaction time, a large portion of NO is converted to NO$_2$ which in turn reacts with water and entrained lime to form calcium nitrate.

Since the boiling point for very diluted nitric acid is about 224° F. (H. Reny, *Treatise on Inorganic Chemistry*, Elsevier), by lowering the flue gas temperature to 240°

F., there should be no danger of acid condensation on the surface of the duct and other equipment. Consequently, no corrosion will result. The temperature of flue gas can be lowered by spraying fine water droplets or steam injection at the downstream side of the fluidized lime reactor.

The Complete Improved Lin $SO_x/NO_x$ Removal System

Figure 10:
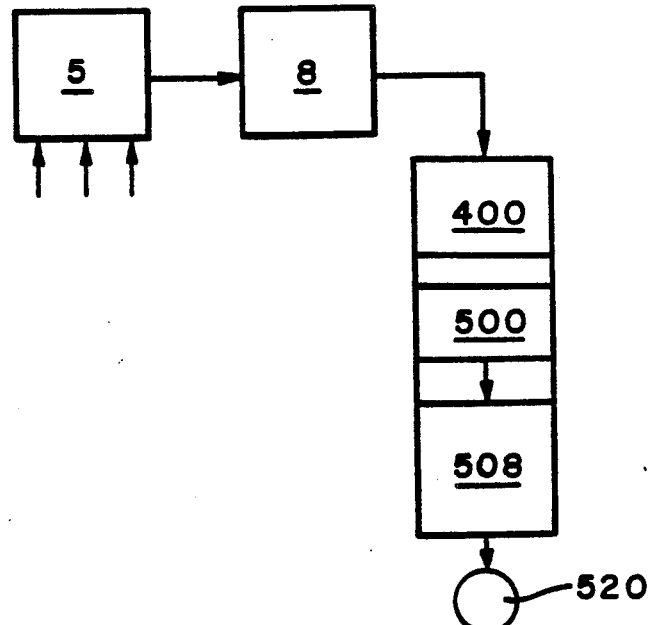
FIG. 10 is an improved process for removing sulfur oxides and nitrogen oxides in accordance with the present invention
Figure 10:
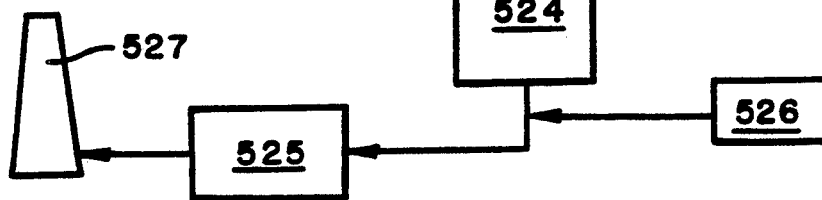

FIG. 10 is a complete, improved Lin $SO_x/NO_x$ removal system based on the latest discovered reaction mechanisms, and pilot plant results, and it is explained as follows. The gas from primary superheater 400 is first passed through the unit 500 for promoting $SO_2$ oxidation to $SO_3$ (see FIGS. through 9) where the gas is exposed to a high temperature environment suddenly and the abrupt change of temperature is the driving force that causes the oxidation of $SO_2$ to $SO_3$. The gas rich in $SO_3$ then enters into a cyclone 520 where larger particles are moved from the gas. The gas then enters a fluidized lime reactor 522 where $SO_3$ reacts with lime to form $CaSO_4$ coating on the surface of unreacted lime. In the presence of $SO_3$, $SO_2$ is oxidized to $SO_3$ and reacts with lime to form $CaSO$ coating also. The reaction mechanism has been fully explained in my U.S. Pat. No. 4,975,257. The gas emission from the fluidized lime reactor is practically free of $SO_x$. The sensible heat of the flue gas is further extracted by the air preheater 524.

At the downstream side the air preheater, steam 526 or a very fine spray of water is introduced to the flue gas for adjusting the gas temperature to about 240° F. The sudden drop of temperature at economizer 508 and air preheater 524 will furnish the driving force required for the oxidation of NO to $NO_2$ which in turn react with steam or water vapor, and entrained lime particles to form $Ca(NO_3)_2$. The particles in the flue gas are removed from the gas stream by bag house 525. The fine particles collected at bag house, containing essentially $CaSO_4$, unreacted lime and $Ca(NO_3)_2$, can be used as fertilizer. The gas emitted from bag house and exit stack 527 is essentially free from solid particles, $NO_x$ and $SO_x$.

In FIG. 10, secondary superheater 5, reheat superheater 8, and components 400, 508, 524, 525 and 527, represent the equipment for power generation which should not be considered as that for pollution control. Since a power plant needs a solids removal system anyway before it can release its gas to the atmosphere, the bag house at the end of the system should not be considered as a part of the $SO_x/NO_x$ removal system Therefore, the actual major equipment used in the Lin $SO_x/NO_x$ removal system are only three units, namely, unit 500 for promoting $SO_x$ oxidation (see FIGS. 2-9), cyclone 520, and fluidized lime reactor 522. Obviously, the capital investment of the new system is lower than that previously. According to my calculations, the capital cost of the system is less than half the cost of my previous system. Obviously the invention can be considered as a major break-through in the art of air pollution control.

The improved $SO_x/NO_x$ removal system is simple to operate, efficient in pollutants removal, and inexpensive in capital investment. Its further development can lead to a cost effective, environmentally acceptable widespread usage of high sulfur coal.

I have developed the unique chemical reaction kinetics and mechanism of the improved Lin $SO_x/NO_x$ removal process, solved the problem of removing sulfur dioxide and nitrogen oxides in flue gas that causes acid rains, and satisfied the long-standing need for a commercially acceptable system for air pollutant control and disposal. Although the present invention has been illustrated and described in connection with a few selected examples and embodiments, it will be understood that they are illustrative of the invention and are by no means restrictive thereof. For example, the improved process can also be used to remove sulfur oxides and nitrogen oxides from gas emissions of industrial boilers, petroleum refineries, sulfuric acid plants, pulping industries, natural gas-treating plants, coking plants of steel industry, and metal (copper, zinc, lead, etc.) smelters in the metal industry. Laser beam or any microwave signal of correct frequency can be employed to excite sulfur dioxide gas molecules and elevate the energy level of the particles. It is reasonable to expect that those skilled in this art can make numerous revisions and adaptations of the invention and it is intended that such revisions and adaptations are include within the scope of the following claims as equivalents of the invention.

What is claimed is:

1. An improved process for effecting the efficient desulfurization of gases containing sulfur oxides, comprising the steps of:
   transmitting flue gas containing sulfur oxides gases through ductwork means,
   subjecting the flue gas to one of increasing the temperature of the flue gas through gaseous interaction and subjecting the flue gas to thermal radiator means, in order to effect a rapid and positive time rate of temperature change so that sulfur dioxide in said flue gas is converted to sulfur trioxide,
   passing the sulfur trioxide rich flue gas to a reactor and providing a calcium containing reactant to the reactor,
   continuously emitting a desulfurized exit gas from the reactor and transmitting the desulfurized exit gas to an exit.

2. The improved process for effecting efficient desulfurization in accordance with claim 1, wherein the thermal radiator means comprises heated impact plate means disposed within said ductwork means.

3. The improved process for effecting efficient desulfurization in accordance with claim 2, further comprising the step of maintaining the temperature of said heated impact plate means by the utilization of electrical energy.

4. The improved process for effecting efficient desulfurization in accordance with claim 3, wherein said heated impact plate means is disposed at an angle between approximately 45° and 60° relative to sides of said ductwork means.

5. The improved process for effecting efficient desulfurization in accordance with claim 2, wherein the heated impact plate means receives heat from hot gases transmitted to said ductwork means.

6. The improved process for effecting efficient desulfurization in accordance with claim 5, wherein gas distribution means is disposed at said ductwork means and about said impact plate means, in order to effect the heating of said impact plate means.

7. The improved process for effecting efficient desulfurization in accordance with claim 6, wherein said distribution means includes perforated plate means for effecting distribution of said gases and baffle means for inducing mixing of the hot gases and improved heat transfer.

8. The improved process for effecting efficient desulfurization in accordance with claim 6, wherein the hot gases flow in a direction generally opposite to a direction of flow of said flue gas.

9. The improved process for effecting efficient desulfurization in accordance with claim 6, wherein said impact plate means is disposed approximately perpendicular to sides of said ductwork means.

10. The improved process for effecting efficient desulfurization in accordance with claim 5, wherein said hot gases are produced by one of burner means and flue gas diverted from a main flow of flue gas.

11. The improved process for effecting efficient desulfurization in accordance with claim 1, further comprising the step of circulating a heated medium through said thermal radiator means in a direction opposite to a flow of said flue gas in order to effect the rapid rate of temperature change of said flue gas.

12. The process for effecting efficient desulfurization in accordance with claim 11, wherein the heated medium is cycled in pipe means through a furnace so that heating of the medium by the furnace and cooling of the medium by passing the medium through a portion of said pipe means in the ductwork means causes the medium to be cycled continuously throughout the pipe means.

13. The process for effecting efficient desulfurization in accordance with claim 1, wherein the step of increasing the temperature of the flue gas through gaseous interaction comprises diverting a stream of flue gas to said ductwork means and transmitting the diverted flue gas through pipe means into said ductwork means so that the diverted flue gas flows out of ends of the pipe means in a direction generally opposite to the flow of flue gas in the ductwork means, the diverted flue gas forming a hot gas layer adjacent the ends of the pipe means and effecting a fast heating of the flow of flue gas in order to effect said rapid rate of temperature change and effect the conversion of sulfur dioxide to sulfur trioxide.

14. The process for effecting efficient desulfurization in accordance with claim 13, wherein the diverted flue gas includes fly ash material in order to enhance molecular collision and convection.

15. An improved process for effecting the efficient desulfurization of gases containing sulfur oxides and removing nitrogen oxides therefrom, comprising the steps of:
    transmitting flue gas containing sulfur oxides gases and nitrogen oxides through ductwork means,
    subjecting the flue gas to one of increasing the temperature of the flue gas through gaseous interaction and subjecting the flue gas to thermal radiator means, so that sulfur dioxide in said flue gas experiences a rapid positive time rate of temperature change and is converted to sulfur trioxide,
    passing the flue gas to a reactor and providing a calcium containing reactant to the reactor, continuously emitting a flow of desulfurized exit
    gas, entrained calcium containing particles, and said nitrogen oxides to means which effects a temperature adjustment thereof,
    subjecting the flow of desulfurized exit gas, entrained calcium containing particles, and nitrogen oxides to water in order to form calcium nitrate, and
    transmitting said flow to an exit.

16. The process in accordance with claim 15, wherein the temperature adjustment means effects a decrease in temperature of the flow, and the interaction with water decreases the flow temperature to about 240° F.

17. The process in accordance with claim 16, further comprising the step of transmitting the flue gas to cyclone means prior to the flue gas entering said reactor.

18. The process in accordance with claim 17, further comprising the step of transmitting said desulfurized exit gas through particle remover means in order to remove particles containing unreacted lime and calcium nitrate.

19. The process in accordance with claim 18, further comprising the step of transmitting said flue gas to superheater means prior to effecting one of increasing the temperature of the flue gas through gaseous interaction and subjecting the flue gas to thermal radiator means.

20. The process in accordance with claim 15, wherein the step of subjecting the flow to water comprises one of providing steam and providing a fine spray of water.

21. The process in accordance with claim 18, wherein the removed particles further comprise fine particles of calcium sulfate, and said removed particles are used as a fertilizer.

* * * * *